United States Patent
Xu et al.

(10) Patent No.: US 12,541,820 B2
(45) Date of Patent: Feb. 3, 2026

(54) DATA PROCESSING METHOD, DEVICE, FILMING SYSTEM, AND COMPUTER STORAGE MEDIUM

(71) Applicant: DIVINE VISION (SHENZHEN) CULTURE TECHNOLOGY CO., LTD., Shenzhen (CN)

(72) Inventors: Jia Xu, Beijing (CN); Wenfei Jiang, Shanghai (CN); Jie Liu, Beijing (CN)

(73) Assignee: DIVINE VISION (SHENZHEN) CULTURE TECHNOLOGY CO., LTD, Shenzhen (CN)

( * ) Notice: Subject to any disclaimer, the term of this patent is extended or adjusted under 35 U.S.C. 154(b) by 699 days.

(21) Appl. No.: 17/580,095

(22) Filed: Jan. 20, 2022

(65) Prior Publication Data

US 2022/0237756 A1    Jul. 28, 2022

(30) Foreign Application Priority Data

Jan. 28, 2021  (CN) .......................... 202110116576.4

(51) Int. Cl.
    *G06T 5/50*      (2006.01)
    *H04N 23/84*     (2023.01)

(52) U.S. Cl.
    CPC ............. *G06T 5/50* (2013.01); *H04N 23/841* (2023.01)

(58) Field of Classification Search
    CPC ...... H04N 23/841; H04N 5/272; H04N 5/262; G06T 5/50
    See application file for complete search history.

(56) References Cited

U.S. PATENT DOCUMENTS

| 5,764,306 A | 6/1998 | Steffano |
| 5,781,198 A | 7/1998 | Korn |
| (Continued) | | |

FOREIGN PATENT DOCUMENTS

| CN | 2550807 Y | * | 5/2003 |
| CN | 101488333 A | | 7/2009 |
| (Continued) | | | |

OTHER PUBLICATIONS

Gadgil NJ, Song Q, Su GM. Image Debanding Using Iterative Adaptive Sparse Filtering. Electronic Imaging. Jan. 2, 20206;32:1-7. (Year: 2020).*

(Continued)

*Primary Examiner* — Tracy Mangialaschi
(74) *Attorney, Agent, or Firm* — Sheppard Mullin Richter & Hampton LLP (57) ABSTRACT

Embodiments of this application provide a data processing method, device, filming system, and computer storage medium. The data processing method includes: obtaining a target background resource to be displayed, where the target background resource includes an image resource and/or a video resource; performing image quality optimization on an image in the background resource according to reference information, where the reference information is used for indicating a situation in a background resource display process; displaying the background resource, to use the image in the background resource as a background for filming. During filming, a terminal device performs image quality optimization on an image in a background resource and then displays a background. This process does not require post matting and synthesis and reduces production costs and time costs. Moreover, on-site filming can ensure that the background matches with lighting effects of a real scene, thereby achieving a better film result.

18 Claims, 4 Drawing Sheets

(56) References Cited

U.S. PATENT DOCUMENTS

| | | | |
|---|---|---|---|
| 6,912,313 B2 | 6/2005 | Li | |
| 7,079,176 B1 | 7/2006 | Freeman et al. | |
| 7,321,387 B2 | 1/2008 | Novais et al. | |
| 7,839,399 B2 | 11/2010 | Benman | |
| 8,155,478 B2 | 4/2012 | Vitsnudel et al. | |
| 8,547,443 B2 | 10/2013 | Tischer | |
| 10,114,838 B2 | 10/2018 | Ali et al. | |
| 11,200,752 B1 * | 12/2021 | Cordes | A63F 13/50 |
| 2002/0001395 A1 | 1/2002 | Davis et al. | |
| 2003/0156077 A1 | 8/2003 | Balogh | |
| 2006/0130017 A1 | 6/2006 | Cohen et al. | |
| 2006/0209744 A1 | 9/2006 | Tischer | |
| 2008/0012988 A1 | 1/2008 | Baharav et al. | |
| 2008/0077953 A1 | 3/2008 | Fernandez et al. | |
| 2009/0167870 A1 | 7/2009 | Caleca et al. | |
| 2011/0085025 A1 | 4/2011 | Pace et al. | |
| 2011/0234841 A1 | 9/2011 | Akeley et al. | |
| 2012/0301127 A1 | 11/2012 | Elliott et al. | |
| 2016/0044294 A1 | 2/2016 | Friedman | |
| 2019/0339590 A1 * | 11/2019 | O'Connell | A63J 5/021 |

FOREIGN PATENT DOCUMENTS

| | | | | |
|---|---|---|---|---|
| CN | 201383314 Y | | 1/2010 | |
| CN | 203827421 U | * | 9/2014 | |
| CN | 110013678 A | * | 7/2019 | |
| CN | 111355889 A | | 6/2020 | |
| CN | 112040092 A | * | 12/2020 | H04N 5/2224 |
| JP | 2003131310 A | | 5/2003 | |
| JP | 2019040004 A | | 3/2019 | |
| WO | WO-2016031912 A1 | * | 3/2016 | H04N 21/2362 |

OTHER PUBLICATIONS

First Search for Chinese Application No. 202110116576.4 mailed on Sep. 13, 2022.
4th Office Action for Chinese Application No. 202110116576.4 mailed on Jan. 6, 2025.
Search Report for Chinese Application No. 202110116576.4 mailed on Jun. 20, 2025.

* cited by examiner

DATA PROCESSING METHOD, DEVICE, FILMING SYSTEM, AND COMPUTER STORAGE MEDIUM

CROSS-REFERENCE TO RELATED APPLICATIONS

This application claims priority to Chinese Patent Application No. 202110116576.4, filed on Jan. 28, 2021, the contents of which are incorporated herein by reference in the entirety.

TECHNICAL FIELD

Embodiments of this application relate to the field of electronic information technologies, and in particular, to a data processing method, a device, a filming system, and a computer storage medium.

BACKGROUND

In the radio and film and television industry, when live filming cannot be performed, generally, a solid color screen is used as a background for filming. That is, a solid color screen is placed at a background where post-production synthesis is required, the green screen area is removed by using video clipping software after filming is completed, and the required background content is filled into the region. However, the post image matting and synthesis stage brings relatively high production costs and time costs to film and television production. In addition, the synthesis technology divides the filming into two parts: on-site filming and post-production editing, which may easily cause mismatch between on-site lighting and lighting effects of the post-production, thereby affecting the final film result.

SUMMARY

In view of this, embodiments of this application provide a data processing method, a device, a filming system, and a computer storage medium, to resolve some or all of the foregoing problems.

According to a first aspect of the embodiments of this application, a data processing method is provided, applicable to a terminal device, the method including: obtaining a target background resource to be displayed, where the target background resource includes an image resource and/or a video resource; performing image quality optimization on an image in the background resource according to reference information; and displaying the background resource, to use the image in the background resource as a background for filming.

According to a second aspect of the embodiments of this application, a data processing method is provided, applicable to a server side, the method including: receiving a download request sent by a terminal device, where the download request is used for requesting to download a target background resource; and sending the background resource and feature information of the background resource to the terminal device according to the download request, to perform image quality optimization on an image in the background resource according to the feature information and use the image in the background resource as a background for filming.

According to a third aspect of the embodiments of this application, a terminal device is provided, including: an obtaining module, configured to obtain a target background resource to be displayed, where the target background resource includes an image resource and/or a video resource; an image quality optimization module, configured to perform image quality optimization on an image in the background resource according to reference information; and a display module, configured to display the background resource, to use the image in the background resource as a background for filming.

According to a fourth aspect of the embodiments of this application, a server side is provided, including: a receiving module, configured to receive a download request sent by a terminal device, where the download request is used for requesting to download a target background resource; and a sending module, configured to send the background resource and feature information of the background resource to the terminal device according to the download request, to perform image quality optimization on an image in the background resource according to the feature information and use the image in the background resource as a background for filming.

According to a fifth aspect of the embodiments of this application, a filming system is provided, including a display screen, a server side, a terminal device, and a filming device, where the terminal device is the terminal device described in the third aspect of the embodiments of this application, and the server side is the server side described in the fourth aspect of the embodiments of this application; the server side and the terminal device are in a communication connection, the server side stores at least one background resource, and the at least one background resource includes an image resource and/or a video resource; the terminal device is configured to send a download request to the server side, where the download request is used for requesting to download a target background resource; the server side is configured to send the target background resource corresponding to the download request to the terminal device; the terminal device is further configured to perform image quality optimization on an image in the background resource according to reference information; the display screen is electrically connected to the terminal device, and configured to display the target background resource transmitted by the terminal device; and the filming device is configured to use, when the display screen displays the target background resource, a picture displayed by the display screen as a background for filming.

According to a sixth aspect of the embodiments of this application, an electronic device is provided, including a processor, a memory, a communication interface, and a communication bus, where the processor, the memory, and the communication interface implement mutual communication by using the communication bus; and the memory is configured to store at least one executable instruction, and the executable instruction, causes the processor to perform operations corresponding to the data processing method described in the first aspect or the second aspect.

According to a seventh aspect of the embodiments of this application, a computer storage medium is provided, storing a computer program, the computer program, when executed by a processor, implementing the data processing method described in the first aspect or the second aspect.

According to the data processing method, the device, the filming system, and the computer storage medium provided in the embodiments of this application, the data processing method includes: obtaining a target background resource to be displayed, where the target background resource includes an image resource and/or a video resource; performing image quality optimization on an image in the background resource according to reference information, where the reference information is used for indicating a situation in a background resource display process; displaying the background resource, to use the image in the background resource as a background for filming. In a filming process, a terminal device performs image quality optimization on an image in a background resource and then displays a background. This process does not require post matting and synthesis and reduces production costs and time costs. In addition, on-site filming can ensure that the background matches with lighting effects of a real scene, thereby achieving a better film result.

BRIEF DESCRIPTION OF THE DRAWINGS

To describe the technical solutions in the embodiments of this application or in the existing technologies more clearly, the following briefly describes the accompanying drawings required for describing the embodiments or the existing technologies. Apparently, the accompanying drawings in the following description show merely a portion of the embodiments of this application, and a person of ordinary skill in the art may still derive other accompanying drawings from the accompanying drawings.

DETAILED DESCRIPTION

To make a person skilled in the art better understand the technical solutions in the embodiments of this application, the following clearly and completely describes the technical solutions in the embodiments of this application with reference to the accompanying drawings in the embodiments of this application. Apparently, the described embodiments are only a portion of the embodiments of this application rather than all of the embodiments. All other embodiments obtained by a person of ordinary skill in the art based on the embodiments of this application shall fall within the protection scope of the embodiments of this application.

The following further describes specific implementations of the embodiments of this application with reference to the accompanying drawings of the embodiments of this application.

Embodiment 1

Figure 1:
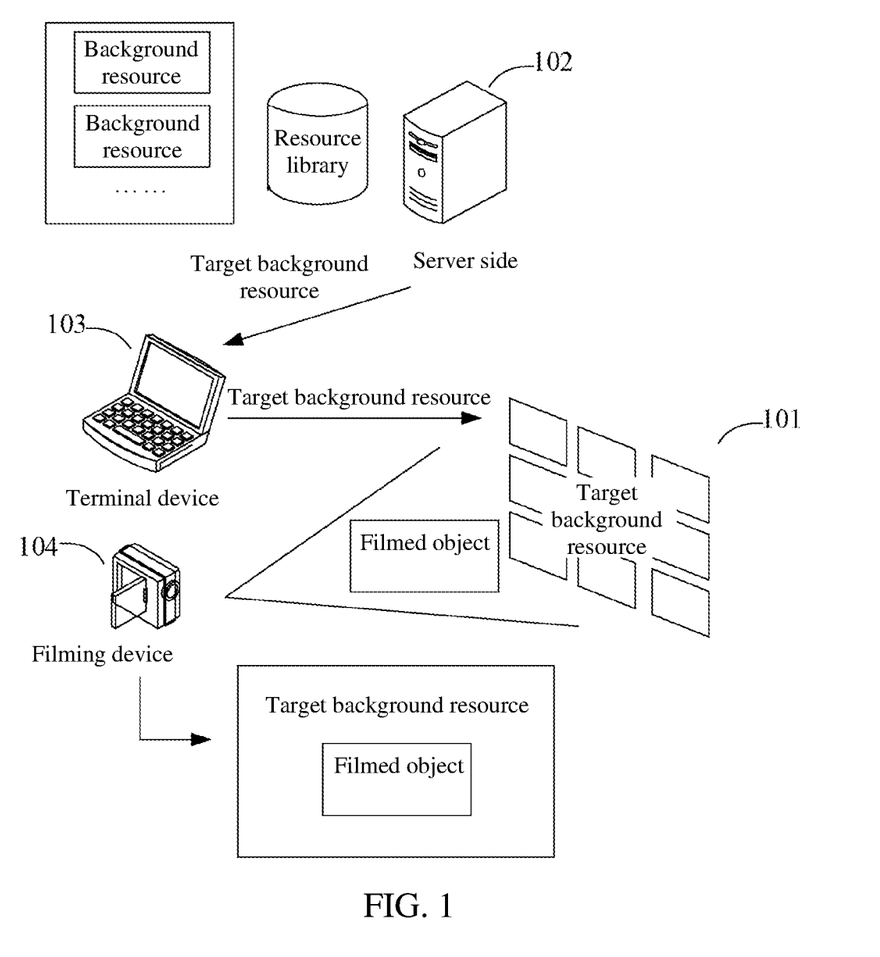
FIG. 1 is a schematic diagram of a filming system according to Embodiment 1 of this application.

Embodiment 1 of this application provides a filming system, and FIG. 1 is a schematic diagram of the filming system according to Embodiment 1 of this application. The filming system shown in FIG. 1 includes a display screen 101, a server side 102, a terminal device 103, and a filming device 104, where the server side 102 and the terminal device 103 are in a communication connection, the server side 102 stores at least one background resource, and the at least one background resource includes an image resource and/or a video resource;

the terminal device 103 is configured to send a download request to the server side 102, where the download request is used for requesting to download a target background resource;

the server side 102 is configured to send the target background resource corresponding to the download request to the terminal device 103;

the terminal device 103 is further configured to perform image quality optimization on an image in the background resource according to reference information;

the display screen 101 is electrically connected to the terminal device 103, and the display screen 101 is configured to display the target background resource transmitted by the terminal device 103; and the filming device 104 is configured to use, when the display screen 101 displays the target background resource, a picture displayed by the display screen 101 as a background for filming.

This embodiment is described by merely using the display screen as an example, and the picture may not be displayed by the display screen. For example, a 3D picture is displayed through holographic projection. In another example, the picture may be displayed on a screen or another plane through a projector. The terminal device may be a device such as a smartphone, a tablet computer, or a notebook computer. The terminal device 103 may access a network and be connected to the server side 102 through the network to perform data exchange. In this application, the network includes a local area network (LAN), a wide area network (WAN), and a mobile communication network such as a world wide web (WWW), a long term evolution (LTE) network, a 2nd-generation (2G) mobile network, a 3rd-generation (3G) mobile network, or a 5th-generation (5G) mobile network.

In this application, the background resource is a resource displayed as a background on the display screen 101 when the filming device performs filming. One background resource may be an image (that is, an image resource) or a video (that is, a video resource). The image may include a dynamic image and a static image. The video may include at least one image frame, and may further include audio data. The background resource may include a 2D video, computer graphics (CG), and a 3D model. The target background resource may be any background resource in the server side 102. This application is described by using the target background resource as an example and does not indicate any limitation, and the same processing as that on the target background resource may be performed on any background resource.

The reference information is used for indicating a situation in the background resource display process. For example, in an embodiment, the reference information includes at least one of feature information, environment parameters, or device parameters, where the feature information may be used for indicating image quality characteristics of the target background resource; the device parameters are used for indicating a display effect supported by the display screen, such as brightness, color gamut, or a bit depth supported by the display screen; and the environment parameters are used for indicating situations of a filming environment, for example, the environment parameters may include ambient light intensity.

With reference to FIG. 1, the terminal device 103 downloads a background resource from the server side 102, and displays the background resource by using the display screen 101. In a filming process, filming is performed by using content (that is, the background resource) displayed by the display screen 101 as a background, and a filmed object is located between a lens of the filming device 104 and the display screen 101, so that a picture that the filmed object is in a scene displayed by the background resource may be directly captured. For example, the background resource may be stored in the server side 102 or filmed by a producer and then uploaded to the server side 102. For example, the producer may film a group of stock videos in a selected road segment to cover different time periods, different weather conditions, or different traffic densities. After necessary post splicing, rendering, and editing and color matching, video content is converted according to a resource standard of the server side 102 to obtain a background resource, and the background resource is then uploaded to the server side 102. If a user needs to use a busy road as a background in a video filming process, the user may use the terminal device 103 to download the background resource from the server side 102, display the background resource on the display screen 101, and use content displayed by the display screen 101 as a background for filming.

Based on the foregoing description, two specific application scenarios are listed herein to describe processing of the server side 102 and the terminal device 103 on a background resource respectively.

Optionally, in the first application scenario, the server side 102 is described in detail. The processing of the server side 102 on a background resource may include: examination, storage, copyright protection, classification, querying, edition, preview, and purchase of the background resource. Four specific examples are respectively listed herein for description.

Optionally, in the first example, the server side 102 is further configured to receive background resources sent by other devices, and store a background resource meeting a resource standard. This describes the examination and storage of a background resource, where the examination is performed by using a resource standard, storage of a background resource not meeting the resource standard is forbidden, and the storage refers to storing the background resource in a cloud resource library. The resource standard of the background resource may stipulate a time period that needs to be covered or a minimum duration, and stipulate a minimum resolution, a bit rate, and model precision of an image in terms of output specification. Standardization of a production stage of a background resource ensures the integrity and quality of the background resource, so that the background resource may be applied in different environments, and the same background resource may be reused for a plurality of times, thereby improving the utilization of the background resource. Further, before the background resource is stored, the background resource may be further encrypted according to a preset encryption algorithm, to implement the copyright protection of the background resource. If the user purchases the background resource through the terminal device 103, encrypted background resource may be downloaded and can be only played in an interface (an application interface or a web page) corresponding to the server side 102, or the encrypted background resource can be only decrypted and played on the terminal device 103 bound to the user, and the user cannot share the background resource to other people for playing.

Optionally, in the second example, the server side 102 is further configured to classify the background resource by using a preset classification model, and add a corresponding tag to the background resource according to a classification result. The classification model may be a pre-trained neural network model that helps the user search the background resource after the user adds a tag to the background resource by using the classification model. The tag is used for indicating a scenario feature displayed by the background resource. For example, the tag may include a night scene, a snowy day, a rainy day, a building, or traffic. The user learns about background resources stored in the server side 102 by browsing pages on the terminal device 103, and may find a required background resource more conveniently by performing screening or searching using the tag.

Optionally, in the third example, the server side 102 is further configured to generate preview data of the background resource, and send the preview data of the background resource to the terminal device 103 when receiving a preview request sent by the terminal device 103. The terminal device 103 plays the preview data. The user may learn about background resources stored in the server side 102 by browsing pages on the terminal device 103. The browsed pages may display the brevity of the background resources and may further display preview data of the background resources. For example, the background resource may be a video resource, the preview data may be a small portion of the video resource, and the user may learn about scenario content of the background resource by viewing the preview data. In another example, the background resource may be an image resource, and the preview data may be a thumbnail of the image resource.

Optionally, In the fourth example, the server side 102 is further configured to generate a download link of the background resource. When the user triggers to download the background resource through the terminal device 103, the terminal device 103 obtains the download link of the background resource, and downloads the background resource according to the download link.

With reference to the foregoing description, the processing of the server side 102 on a background resource may further include image data analysis and image quality restoration on the background resource. Three examples are respectively listed herein for description.

Optionally, In the first example, the server side 102 is further configured to perform image data analysis on at least one of image brightness, noise intensity, a blur degree, or a problematic region of a target background resource, and generate feature information according to a result of the image data analysis, where the feature information is used for indicating at least one of the image brightness, the noise intensity, the blur degree, or the problematic region of the target background resource. For example, image data analysis may be performed on the background resource by using an image processing algorithm and/or a neural network model, and corresponding adjustment may be performed on the background resource according to an analysis result, to meet a filming requirement.

Optionally, in the second example, the server side 102 is further configured to perform image quality restoration on the target background resource according to the feature information. For example, if noise intensity of an image in the background resource is relatively large, noise reduction processing may be performed. In another example, if transition of color gradient of the image of the background resource is not smooth, and gradient stripes are generated, a grayscale/bit depth may be increased. In another example, if the image of the background resource is blur due to a relatively low sharpening degree of the image, sharpening may be increased.

Optionally, in the third example, the server side 102 is further configured to determine a bit rate of the target background resource according to the feature information, compress the target background resource according to the determined bit rate of the target background resource, and transmit the compressed target background resource to the terminal device 103. For example, in the image of the background resource, a relatively high compression ratio is generally used for a low-detail region to save bit rates. However, such a compression strategy may lead to appearance of color bands during display, and the problem may be relatively apparent when displayed content is used as a background. Therefore, in this application, a higher bit rate may be distributed to the low-detail region, so that color transition of this region is smoother, thereby avoiding the color band problem.

Optionally, in the second application scenario, the terminal device 103 side is described in detail, namely, on-site filming is described.

Optionally, in an embodiment, the display screen 101 may include a light-emitting diode (LED) screen array, and the LED screen array includes at least two LED screens. During on-site filming, small screens may be spliced to obtain the entire display screen 101, and an LED screen array may be built at a position where the LED display screen 101 needs to be used according to a real scene built on site, a filming angle, and a screen size. One small screen may be a square screen with a size of 0.5 m×0.5 m.

After obtaining the background resource from the server side 102, the terminal device 103 may further adjust the background resource during display. For example, the terminal device 103 is further configured to adjust one or more of image parameters of the background resource and device parameters of the display screen 101, to meet a filming requirement. For example, the image parameters of the background resource may include brightness, hue, a color temperature, and a bit depth. The device parameters of the display screen 101 may include brightness, hue, and a color temperature. Adjustment on the image parameters and/or the device parameters by the terminal device 103 may be performed according to an adjustment instruction inputted by the user or may be performed automatically. Four specific examples are respectively listed herein for description.

Optionally, in the first example, the terminal device 103 is configured to obtain an adjustment instruction of the user, and perform image optimization on the image in the background resource according to the adjustment instruction. For example, when a photographer needs to increase brightness of a filming background to improve lighting effects of the background, distinguishing processing is performed on a dark region and a bright region according to image brightness information in the feature information, and for a region where color scale stripes may occur and defects become apparent after brightness is increased, the original brightness may be kept unchanged.

Optionally, in the second example, the terminal device 103 is further configured to receive feature information corresponding to the target background resource and sent by the server side 102, where the feature information is used for indicating image quality characteristics of the target background resource; and perform image quality optimization on the target background resource according to the feature information. The terminal device 103 performs image quality optimization on the background resource, so that the filming requirement may be better met and the filming quality may be improved. For example, using an example in which the feature information indicates that the image in the background resource includes gradient stripes, for such a situation, if color gamut of the display screen reaches a standard of P3 and a bit depth of the display screen supports 10 bits or higher, additional processing may be not performed; and if the bit depth of the display screen is lower than 10 bits or the color gamut cannot reach the standard of P3, image quality optimization may be performed on the image in the background resource. DCI-P3, sometimes casually referred to as P3 or Display P3, stands for Digital Cinema Initiatives-Protocol 3 and is a color space, or set of colors, created to standardize the colors used in the film industry. For example, color scale smoothing optimization may be performed, to cause color scale transition to approach smooth. Optionally, the color scale smoothing optimization may include: determining whether a color difference between two adjacent color bands is greater than 1, and if the color difference is greater than 1, dividing the two adjacent color bands into N finer color bands, where in the N finer color bands, a color difference between each two adjacent color bands is less than or equal to 1, and N is an integer greater than 2. The foregoing processing may be only performed on a portion of regions in the image of the background resource, or may be performed on all regions in the image.

Optionally, in the third example, the reference information further includes device parameters; and the terminal device 103 is further configured to determine, according to the device parameters, a display effect supported by the display screen, and perform image quality optimization on the image in the background resource according to the display effect supported by the display screen and the feature information. Image quality optimization is performed on the image in the background resource according to the device parameters and the feature information, so that when the background resource is displayed by using the display screen, characteristics of the display screen may be met, thereby causing the display effect to reach the filming requirement.

Optionally, in the fourth example, the reference information further includes environment parameters; and the terminal device 103 is further configured to determine, according to the environment parameters, a film result after filming is performed in an environment indicated by the environment parameters by using the background resource as a background; and perform image quality optimization on the image in the background resource according to the film result and the feature information. Because environmental impact is taken into consideration, when the background resource on which image quality optimization has been performed according to the environment parameters and the feature information is displayed through the display screen, a current environment is met, thereby meeting the filming requirement.

Image quality optimization may be alternatively performed on the image in the background resource according to the feature information, the device parameters, and the environment parameters, and the foregoing is merely for an exemplary description and does not indicate that this application is limited thereto.

Figure 2:
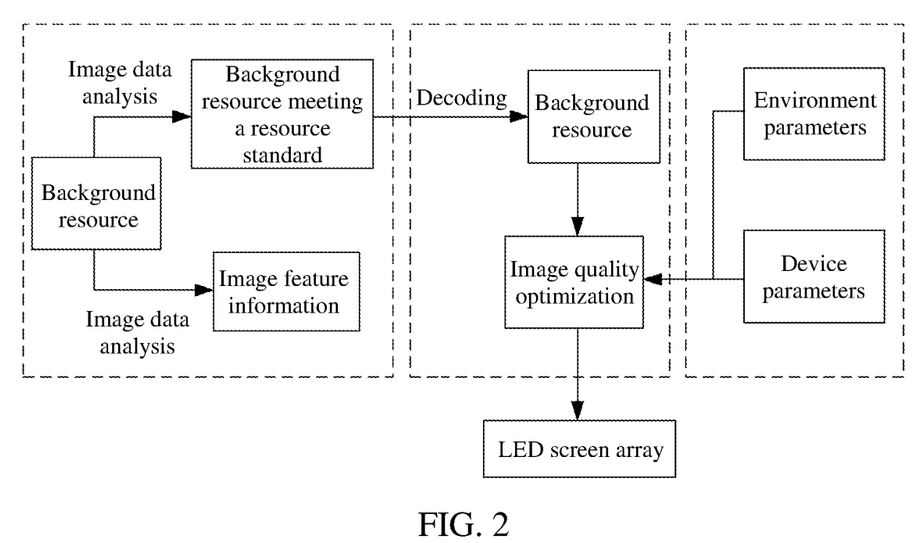
FIG. 2 is a block diagram of image quality optimization according to Embodiment 1 of this application.

Optionally, as shown in FIG. 2, with reference to the processing of the server side and the terminal device on a background resource, FIG. 2 is a block diagram of image quality optimization according to Embodiment 1 of this application. The server side performs image data analysis on the background resource, generates feature information according to an analysis result, performs image quality restoration according to the feature information, and obtain a background resource meeting a resource standard. The terminal device downloads the background resource from the server side and decodes the background resource, and performs image quality optimization on the background resource according to the feature information. The terminal device may further adjust environment parameters and device parameters, where the environment parameters may include brightness of ambient light (lighting), and finally display the adjusted background resource on an LED screen array.

Figure 3:
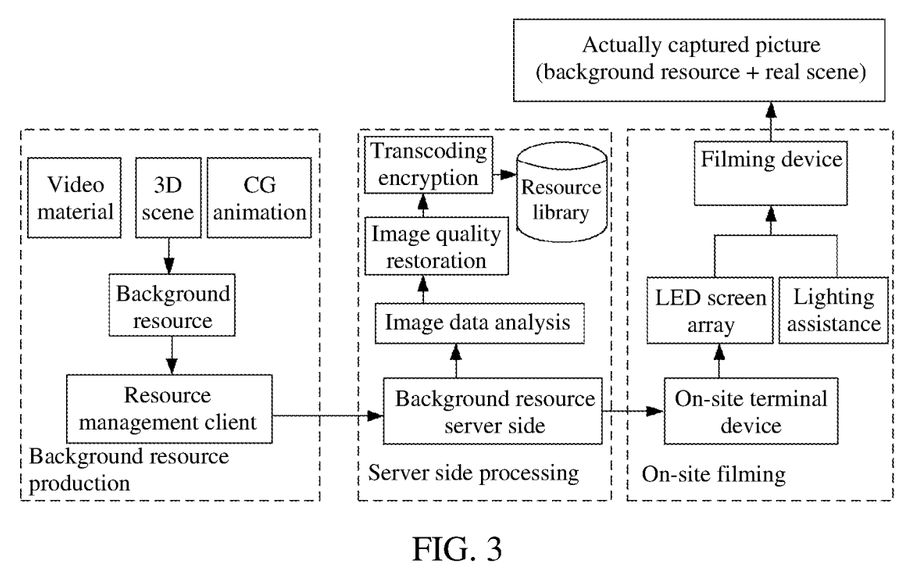
FIG. 3 is a logic block diagram of a filming method according to Embodiment 1 of this application.

Optionally, with reference to the filming system shown in FIG. 1, FIG. 3 is a logic block diagram of a filming method according to Embodiment 1 of this application. In FIG. 3, the filming method includes three parts: background resource production, server side processing, and on-site filming. In the background resource production part, the producer photographs a video, edits the video according to a resource standard of a background resource, and uploads the background resource to the server side by using another device (a resource management client). In the server side processing part, the server side examines and stores the uploaded background resource, and may further perform image data analysis, image quality restoration, and transcoding encryption on the background resource. In the on-site filming part, the terminal device downloads the background resource from the server side, performs image quality optimization on the background resource, displays the background resource on an LED screen array (that is, the display screen), and performs filming by using a filming device using a picture displayed by the LED screen array as a background. A better film result may be further achieved with the assistance of lighting in a filming process. A finally captured actual picture includes content displayed by the background resource and a real scene, thereby achieving a better film result and reducing production costs and time costs. Using filming of movies and television plays as an example, an actor/actress performs when a display screen displays a background resource without imaging a scene, so that the actor/actress may be substituted into the scene more easily. With reference to the foregoing description, two specific examples are listed herein. For example, in a movie and television play filming process, if one building such as a hotel or a factory needs to be filmed, a site needs to be rented for on-site filming, filming may be not permitted, and normal operation of the other part may be affected. Therefore, a video background resource of the required hotel or factory may be downloaded from a server side, the background resource is then displayed, and an actor/actress stands in front of a displayed picture to perform to complete filming. In another example, if an inaccessible place such as a scenic area, a place that has disappeared in history, or a place created depending on imagination needs to be filmed, similarly, a related background resource may be downloaded from the server side, and the background resource is then displayed for filming. In this way, not only front-end costs of renting a real place are greatly reduced, but also back-end edition costs are reduced, and the actor/actress can be substituted into the scene more easily during performance.

The filming system provided in the embodiments of this application includes a display screen, a server side, a terminal device, and a filming device, where the server side and the terminal device are in a communication connection, the server side stores at least one background resource, and the at least one background resource includes an image resource and/or a video resource; the terminal device is configured to send a download request to the server side, and the server side is configured to send a target background resource corresponding to the download request to the terminal device; the terminal device is further configured to perform image quality optimization on an image in the background resource according to reference information; the display screen is electrically connected to the terminal device, and configured to display the target background resource transmitted by the terminal device; and the filming device is configured to use, when the display screen displays the target background resource, a picture displayed by the display screen as a background for filming. In a filming process, a terminal device performs image quality optimization on an image in a background resource and then displays a background. This process does not require post matting and synthesis and reduces production costs and time costs. In addition, on-site filming can ensure that the background matches with lighting effects of a real scene, thereby achieving a better film result.

Embodiment 2

Figure 4:
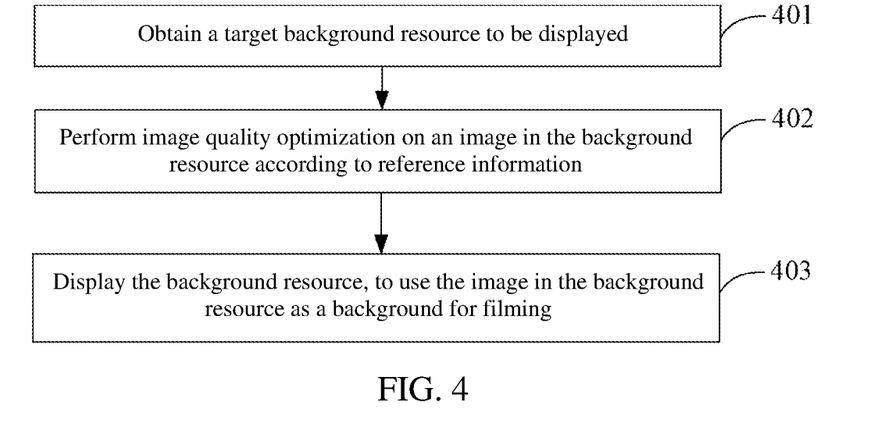
FIG. 4 is a flowchart of a data processing method according to Embodiment 2 of this application.

With reference to the filming system described in Embodiment 1, Embodiment 2 of this application provides a data processing method, applicable to the terminal device shown in FIG. 1. FIG. 4 is a flowchart of the data processing method according to Embodiment 2 of this application, and the method includes the following steps:

Step 401: Obtaining a target background resource to be displayed.

The target background resource includes an image resource and/or a video resource. Optionally, in an embodiment, the obtaining a target background resource to be displayed includes: sending a download request to a server side, where the download request is used for requesting to download the target background resource; and receiving the target background resource sent by the server side according to the download request, where the server side stores at least one background resource. The user may purchase the target background resource by using the terminal device, and after the target background resource is successfully purchased, the terminal device downloads the target background resource according to a download link of the target background resource. Optionally, in another embodiment, the target background resource is stored on the terminal device or another device, and the terminal device directly reads the target background resource.

Step 402: Performing image quality optimization on an image in the background resource according to reference information.

Optionally, the reference information includes at least one of feature information, environment parameters, or device parameters. Further, three examples are respectively listed herein for description.

Optionally, in the first example, the reference information includes the feature information; the method further includes: receiving feature information corresponding to the target background resource sent by the server side, where the feature information is used for indicating image quality characteristics of the target background resource; and the performing image quality optimization on an image in the background resource according to reference information includes: performing image quality optimization on the target background resource according to the feature information.

Optionally, in the second example, the reference information includes the feature information and the device parameters; and the performing image quality optimization on an image in the background resource according to reference information includes: determining, according to the device parameters, a display effect supported by a display screen, and performing image quality optimization on the image in the background resource according to the display effect supported by the display screen and the feature information.

Optionally, in the third example, the reference information includes the feature information and the environment parameters; and the performing image quality optimization on an image in the background resource according to reference information includes: determining, according to the environment parameters, a film result after filming is performed in an environment indicated by the environment parameters by using the background resource as a background; and performing image quality optimization on the image in the background resource according to the film result and the feature information.

The foregoing is merely for an exemplary description. The reference information may alternatively include the feature information, the device parameters, and the environment parameters, and image quality optimization may be performed on the image in the background resource according to the feature information, the device parameters, and the environment parameters.

Step 403: Displaying the background resource, to use the image in the background resource as a background for filming.

Two examples are listed herein for specific description. In the first example, the background resource may be displayed by using the display screen, to use the image in the background resource displayed by the display screen as a background for filming, and the display screen may be an LED screen array. In the second example, the displaying the background resource, to use the image in the background resource as a background for filming includes: displaying the background resource by using a holographic projection technology, to use a 3D picture in the background resource as a background for filming. The 3D picture in the background resource is displayed by using a holographic projection technology, so that a displayed picture may be better merged into an actual environment, and a better film result is achieved.

The user may replace the background resource through an interaction operation, for example, the method further includes: detecting a user operation to generate a background replacement request, and sending the background replacement request to the server side, where the background replacement request is used for instructing to replace with a new background; and receiving a new background resource sent by the server side, and replacing the background with the new background resource, to use an image in the new background resource as a background for filming. The new background resource may be processed similarly according to the description of steps 401 to 403 and displayed, and details are not described herein again.

According to the data processing method provided in this embodiment of this application, a target background resource to be displayed is obtained, where the target background resource includes an image resource and/or a video resource; image quality optimization is performed on an image in the background resource according to reference information, where the reference information is used for indicating a situation in a background resource display process; and the background resource is displayed, to use the image in the background resource as a background for filming. In a filming process, a terminal device performs image quality optimization on an image in a background resource and then displays a background. This process does not require post matting and synthesis and reduces production costs and time costs. In addition, on-site filming can ensure that the background matches with lighting effects of a real scene, thereby achieving a better film result.

Embodiment 3

Figure 5:
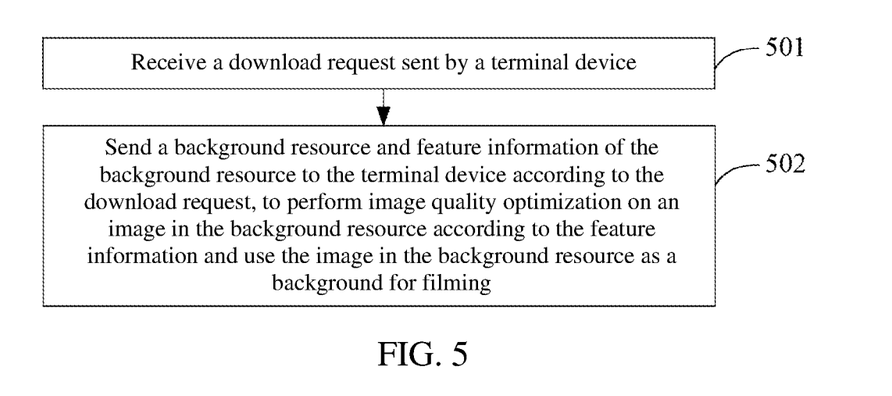
FIG. 5 is a flowchart of a data processing method according to Embodiment 3 of this application.

With reference to the filming system described in Embodiment 1, Embodiment 3 of this application provides a data processing method, applicable to the server side shown in FIG. 1. FIG. 5 is a flowchart of a data processing method according to Embodiment 3 of this application, and the method includes the following steps:

Step 501: Receiving a download request sent by a terminal device.

The download request is used for requesting to download a target background resource.

The server side stores at least one background resource, and the background resource of the server side may be uploaded by a producer of the background resource through another device. For example, in an embodiment, the method further includes: receiving background resources sent by other devices, encrypting a background resource meeting a resource standard according to a preset encryption algorithm, and storing the background resource.

Further, the server side may further perform image data analysis on the background resource. Using the target background resource as an example, the method further includes: performing image data analysis on at least one of image brightness, noise intensity, a blur degree, or a problematic region of the target background resource, and generating feature information according to a result of the image data analysis, where the feature information is used for indicating at least one of the image brightness, the noise intensity, the blur degree, or the problematic region of the target background resource. After image data analysis is performed on the background resource, the background resource may be processed according to the feature information obtained through analysis. Two examples are respectively listed herein for description.

Optionally, in the first example, the method further includes: performing image quality restoration on the target background resource according to the feature information. For example, the image quality restoration may include noise reduction or grayscale/bit depth increasing.

Optionally, in the second example, the method further includes: determining a bit rate of the target background resource according to the feature information, compressing the target background resource according to the determined bit rate of the target background resource, and transmitting the compressed target background resource to the terminal device.

The server side may further perform other processing on the background resource, which is described in detail in Embodiment 1 and is not described herein again.

Step 502: Sending the background resource and feature information of the background resource to the terminal device according to the download request, to perform image quality optimization on an image in the background resource according to the feature information and use the image in the background resource as a background for filming.

According to the data processing method provided in this embodiment of this application, a download request sent by a terminal device is received, where the download request is used for requesting to download a target background resource; and the background resource and feature information of the background resource are sent to the terminal device according to the download request, to perform image quality optimization on an image in the background resource according to the feature information and use the image in the background resource as a background for filming. In a filming process, a terminal device performs image quality optimization on an image in a background resource and then displays a background. This process does not require post matting and synthesis and reduces production costs and time costs. In addition, on-site filming can ensure that the background matches with lighting effects of a real scene, thereby achieving a better film result.

Embodiment 4

Figure 6:
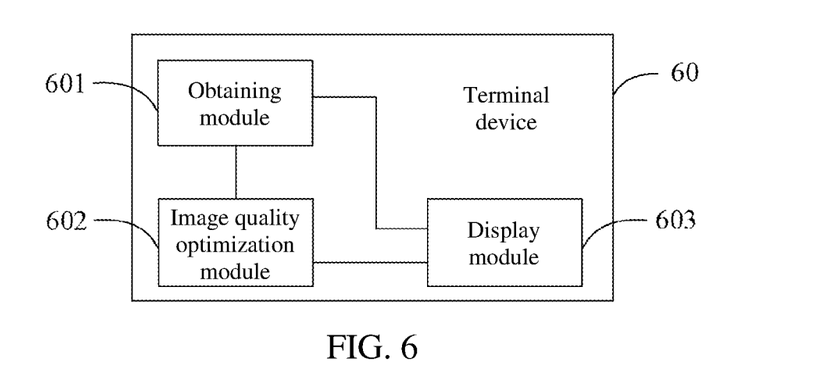
FIG. 6 is a structural diagram of a terminal device according to Embodiment 4 of this application.

With reference to the description of Embodiment 1 and Embodiment 2, Embodiment 4 of this application provides a terminal device configured to perform the method according to Embodiment 2. Referring to FIG. 6, the terminal device includes:

an obtaining module 601, configured to obtain a target background resource to be displayed, where the target background resource includes an image resource and/or a video resource;

an image quality optimization module 602, configured to perform image quality optimization on an image in the background resource according to reference information; and a display module 603, configured to display the background resource, to use the image in the background resource as a background for filming.

Optionally, in an embodiment of this application, the reference information includes at least one of feature information, environment parameters, or device parameters.

Optionally, in an embodiment of this application, the reference information includes feature information; the obtaining module 601 is further configured to: receive feature information corresponding to the target background resource sent by a server side, where the feature information is used for indicating image quality characteristics of the target background resource; and the image quality optimization module 602 is configured to perform image quality optimization on the target background resource according to the feature information.

Optionally, in an embodiment of this application, the reference information further includes device parameters; and the image quality optimization module 602 is configured to determine, according to the device parameters, a display effect supported by a display screen, and perform image quality optimization on the image in the background resource according to the display effect supported by the display screen and the feature information.

Optionally, in an embodiment of this application, the reference information further includes environment parameters; and the image quality optimization module 602 is configured to determine, according to the environment parameters, a film result after filming is performed in an environment indicated by the environment parameters by using the background resource as a background; and perform image quality optimization on the image in the background resource according to the film result and the feature information.

Optionally, in an embodiment, the obtaining module 601 is configured to send a download request to the server side, where the download request is used for requesting to download the target background resource; and receive the target background resource sent by the server side according to the download request, where the server side stores at least one background resource.

According to the terminal device provided in this embodiment of this application, a target background resource to be displayed is obtained, where the target background resource includes an image resource and/or a video resource; image quality optimization is performed on an image in the background resource according to reference information, where the reference information is used for indicating a situation in a background resource display process; and the background resource is displayed, to use the image in the background resource as a background for filming. In a filming process, a terminal device performs image quality optimization on an image in a background resource and then displays a background. This process does not require post matting and synthesis and reduces production costs and time costs. In addition, on-site filming can ensure that the background matches with lighting effects of a real scene, thereby achieving a better film result.

Embodiment 5

Figure 7:
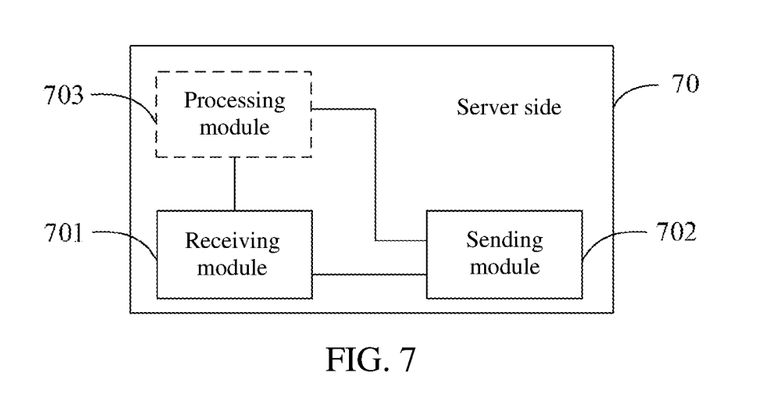
FIG. 7 is a structural diagram of a server side according to Embodiment 5 of this application.

With reference to the description of Embodiment 1 and Embodiment 3, Embodiment 5 of this application provides a server side configured to perform the method according to Embodiment 3. Referring to FIG. 7, the server side includes:

a receiving module 701, configured to receive a download request sent by a terminal device, where the download request is used for requesting to download a target background resource; and a sending module 702, configured to send the background resource and feature information of the background resource to the terminal device according to the download request, to perform image quality optimization on an image in the background resource according to the feature information and use the image in the background resource as a background for filming.

The server side further includes a processing module 703, and optionally, in an embodiment of this application, the processing module is configured to perform image quality restoration on the target background resource according to the feature information.

Optionally, in an embodiment of this application, the processing module 703 is configured to determine a bit rate of the target background resource according to the feature information, compress the target background resource according to the determined bit rate of the target background resource, and transmit the compressed target background resource to the terminal device.

Optionally, in an embodiment of this application, the receiving module 701 is further configured to receive background resources sent by other devices; and the processing module 703 is configured to encrypt a background resource meeting a resource standard according to a preset encryption algorithm, and store the background resource.

According to the server side provided in this embodiment of this application, a download request sent by a terminal device is received, where the download request is used for requesting to download a target background resource; and the background resource and feature information of the background resource are sent to the terminal device according to the download request, to perform image quality optimization on an image in the background resource according to the feature information and use the image in the background resource as a background for filming. In a filming process, a terminal device performs image quality optimization on an image in a background resource and then displays a background. This process does not require post matting and synthesis and reduces production costs and time costs. In addition, on-site filming can ensure that the background matches with lighting effects of a real scene, thereby achieving a better film result.

Embodiment 6

Figure 8:
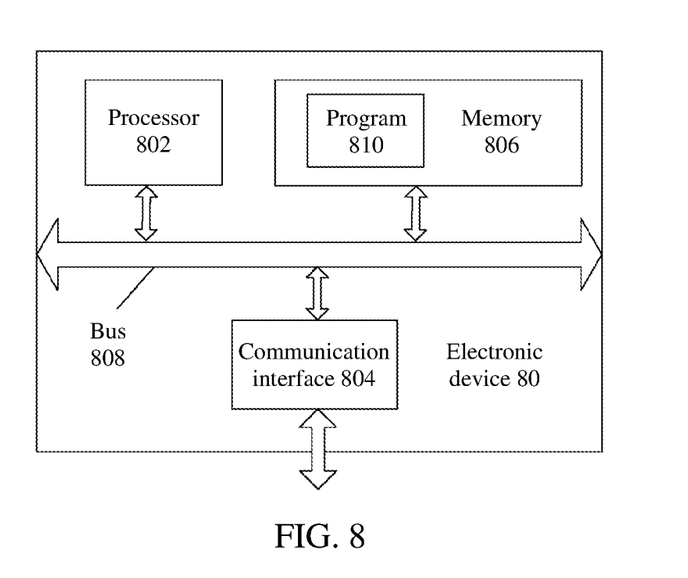
FIG. 8 is a structural diagram of an electronic device according to Embodiment 6 of this application.

Based on the description of Embodiment 1 to Embodiment 5, Embodiment 6 of this application provides an electronic device configured to perform the method according to Embodiment 2 or Embodiment 3. FIG. 8 is a schematic structural diagram of an electronic device according to Embodiment 6 of this application, and specific implementations of the electronic device are not limited in specific embodiments of this application.

As shown in FIG. 8, the electronic device may include a processor 802, a communication interface 804, a memory 806, and a communication bus 808.

The processor 802, the communication interface 804, and the memory 806 perform mutual communication by using the communication bus 808.

The communication interface 804 is configured to communicate with another electronic device such as a terminal device or a server.

The processor 802 is configured to execute a program 810, to perform related steps in the foregoing method embodiments.

For example, the program 810 may include program code, and the program code includes a computer operation instruction.

The processor 802 may be a central processing unit (CPU) or an application-specific integrated circuit (ASIC) or may be configured as one or more integrated circuits for implementing the embodiments of this application. One or more processors included by the electronic device may be processors of the same type such as one or more CPUs, or may be processors of different types such as one or more CPUs and one or more ASICs.

The memory 806 is configured to store the program 810. The memory 806 may include a high-speed random access memory (RAM), or may further include a non-volatile memory, for example, at least one magnetic disk memory.

The program 810 may be used for causing the processor 802 to perform any method in Embodiment 2 or Embodiment 3.

For specific implementations of steps in the program 810, reference may be made to corresponding description in corresponding steps and units in the foregoing data processing method embodiments, and details are not described herein again. A person skilled in the art can clearly understand that for convenience and conciseness of description, for specific working processes of the foregoing described devices and modules, reference may be made to the corresponding processes in the foregoing method embodiments, and details are not described herein again.

According to the data processing method provided in this embodiment of this application, a target background resource to be displayed is obtained, where the target background resource includes an image resource and/or a video resource; image quality optimization is performed on an image in the background resource according to reference information, where the reference information is used for indicating a situation in a background resource display process; and the background resource is displayed, to use the image in the background resource as a background for filming. In a filming process, a terminal device performs image quality optimization on an image in a background resource and then displays a background. This process does not require post matting and synthesis and reduces production costs and time costs. In addition, on-site filming can ensure that the background matches with lighting effects of a real scene, thereby achieving a better film result.

Embodiment 7

Based on the description of Embodiment 1 to Embodiment 5, Embodiment 7 of this application provides a computer storage medium, storing a computer program, the program, when executed by a processor, implementing the method according to Embodiment 2 or Embodiment 3.

According to implementation requirements, various components/steps described in the embodiments of this application may be divided into more components/steps, or two or more components/steps or a portion of operations of the components/steps are combined into a new component/step, to achieve the objectives of the embodiments of this application.

The foregoing method according to the embodiments of this application may be implemented in hardware or firmware, or may be implemented as software or computer code that may be stored in a recording medium (such as a CD ROM, a RAM, a floppy disk, a hard disk, or a magneto-optical disk), or may be implemented as computer code obtained through network downloading, originally stored in a remote recording medium or a non-transitory machine-readable medium and to be stored in a local recording medium, so that the method described herein may be stored in a recording medium using a general-purpose computer, an ASIC, or programmable or dedicated hardware (such as ASIC or FPGA) for software processing. It may be understood that, in a computer, a processor, a microprocessor controller, or programmable hardware including a memory component (for example, a RAM, a ROM, or a flash memory) that can store or receive software or computer code, when the software or computer code is accessed and executed by the computer, the processor, or the hardware, the data processing method described herein is implemented. In addition, when a general-purpose computer accesses code of the data processing method shown herein, execution of the code may convert the general-purpose computer into a dedicated computer configured to perform the data processing method shown herein.

A person of ordinary skill in the art may be aware that the exemplary units and method steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of the embodiments of this application.

The foregoing implementations are merely used for describing the embodiments of this application, and are not used for limiting the embodiments of this application. A person of ordinary skill in the related art may further make various changes and variants without departing from the spirit and scope of the embodiments of this application, so that all equivalent technical solutions also fall within the scope of the embodiments of this application, and the protection scope of the embodiments of this application shall be subject to the claims.

What is claimed is:

1. A data processing method, comprising:
   downloading, by a terminal device, a background resource to be displayed, wherein the background resource comprises at least one of the following: an image resource and a video resource;
   obtaining, by the terminal device, reference information for displaying the background resource, the reference information comprising:
      feature information indicating image quality characteristics of the background resource, the feature information being generated based on an analysis of at least one of image brightness, noise intensity, blur degree, or a problematic region of the background resource, and
      one or more device parameters of a display screen disposed behind an object indicating a display effect supported by the display screen, including at least a color gamut and a bit depth;
   determining, by the terminal device, whether the display effect supported by the display screen is sufficient to render smooth color transitions in the background resource based on at least the color gamut and the bit depth;
   in response to determining that the display effect is insufficient, performing, by the terminal device, image quality optimization on an image in the background resource according to the reference information to reduce visual artifacts by adjusting one or more pixel-level color transitions; and
   displaying, by the terminal device, the background resource on the display screen disposed behind the object, to use the image in the background resource as a background of the object for filming.

2. The method according to claim 1, wherein the image quality optimization comprises:
   determining if the color gamut of the display screen reaches a standard of P3 and if the bit depth of the display screen is 10 bits or higher;
   in response to determining that the color gamut of the display screen does not reach the standard of P3 or the bit depth of the display screen is lower than 10 bits, determining whether a color difference between two adjacent color bands of the image is greater than 1; and
   if the color difference is greater than 1, dividing the two adjacent color bands into a number (N) of finer color bands, wherein a color difference between each two adjacent color bands of the N finer color bands is less than or equal to 1, and N is an integer greater than 2.

3. The method according to claim 1, wherein the reference information comprises the feature information corresponding to the background resource;
   the performing image quality optimization on an image in the background resource according to reference information comprises: performing image quality optimization on the background resource according to the feature information.

4. The method according to claim 3, wherein the reference information further comprises the one or more device parameters; and the performing image quality optimization on an image in the background resource according to reference information comprises:
   determining, according to the device parameters, the display effect supported by the display screen, and performing the image quality optimization on the image in the background resource according to the display effect supported by the display screen and the feature information.

5. The method according to claim 3, wherein the reference information further comprises one or more environment parameters indicating a filming environment of the object; and the performing image quality optimization on an image in the background resource according to reference information comprises:
   determining, according to the environment parameters, a film result after filming is performed on the object in the filming environment indicated by the environment parameters with the background resource as a background; and
   performing the image quality optimization on the image in the background resource according to the film result and the feature information.

6. The method according to claim 1, wherein the obtaining a background resource to be displayed comprises:
   sending a download request to a server, for requesting to download the background resource; and
   receiving the background resource from the server according to the download request, wherein the server stores at least one background resource.

7. The method according to claim 6, wherein the method further comprises:
   detecting, by the terminal device, a user operation to generate a background replacement request, and sending, by the terminal device, the background replacement request to the server, wherein the background replacement request instructs to replace the background resource with a new background resource; and
   receiving, by the terminal device, a new background resource from the server, and replacing, by the terminal device, the background resource with the new background resource, to use an image in the new background resource for filming.

8. The method according to claim 1, wherein the displaying the background resource, to use the image in the background resource as a background for filming comprises:
   displaying the background resource as a 3D image by holographic projection.

9. The method according to claim 1, wherein the method further comprises:
   performing, by a server, image quality restoration on the background resource according to the feature information.

10. The method according to claim 1, wherein the method further comprises:
    determining, by a server, a bit rate of the background resource according to the feature information, compressing, by the server, the background resource according to the determined bit rate of the background resource, and transmitting, by the server, the compressed background resource to the terminal device.

11. The method according to claim 1, wherein the method further comprises:
    receiving, by a server, background resources sent by other devices, encrypting, by the server, a background resource meeting a resource standard according to a preset encryption algorithm, and storing, by the server, the background resource.

12. One or more non-transitory computer-readable storage media of a terminal device storing instructions executable by one or more processors, wherein execution of the instructions causes the one or more processors to perform operations comprising:

downloading a background resource to be displayed, wherein the background resource comprises at least one of the following: an image resource and a video resource;

obtaining reference information for displaying the background resource, the reference information comprising:

feature information indicating image quality characteristics of the background resource, the feature information being generated based on an analysis of at least one of image brightness, noise intensity, blur degree, or a problematic region of the background resource, and   one or more device parameters of a display screen disposed behind an object indicating a display effect supported by the display screen, including at least a color gamut and a bit depth;

determining, by the terminal device, whether the display effect supported by the display screen is sufficient to render smooth color transitions in the background resource based on at least the color gamut and the bit depth;

in response to determining that the display effect is insufficient, performing image quality optimization on an image in the background resource according to the reference information to reduce visual artifacts by adjusting one or more pixel-level color transitions; and  displaying the background resource on the display screen disposed behind the object, to use the image in the background resource as a background of the object for filming.

13. The one or more non-transitory computer-readable storage media according to claim 12, wherein the image quality optimization comprises:

determining if the color gamut of the display screen reaches a standard of P3 and if the bit depth of the display screen is 10 bits or higher;

in response to determining that the color gamut of the display screen does not reach the standard of P3 or the bit depth of the display screen is lower than 10 bits, determining whether a color difference between two adjacent color bands of the image is greater than 1; and  if the color difference is greater than 1, dividing the two adjacent color bands into a number (N) of finer color bands, wherein a color difference between each two adjacent color bands of the N finer color bands is less than or equal to 1, and N is an integer greater than 2.

14. The one or more non-transitory computer-readable storage media according to claim 12, wherein the reference information comprises the feature information corresponding to the background resource;

the performing image quality optimization on an image in the background resource according to reference information comprises: performing image quality optimization on the background resource according to the feature information.

15. The one or more non-transitory computer-readable storage media according to claim 14, wherein the reference information further comprises the one or more device parameters; and the performing image quality optimization on an image in the background resource according to reference information comprises:

determining, according to the device parameters, the display effect supported by the display screen, and performing the image quality optimization on the image in the background resource according to the display effect supported by the display screen and the feature information.

16. The one or more non-transitory computer-readable storage media according to claim 14, wherein the reference information further comprises one or more environment parameters indicating a filming environment of the object; and the performing image quality optimization on an image in the background resource according to reference information comprises:

determining, according to the environment parameters, a film result after filming is performed on the object in the filming environment indicated by the environment parameters with the background resource as a background; and  performing the image quality optimization on the image in the background resource according to the film result and the feature information.

17. The one or more non-transitory computer-readable storage media according to claim 12, wherein the obtaining a background resource to be displayed comprises:

sending a download request to a server, for requesting to download the background resource; and  receiving the background resource from the server according to the download request, wherein the server stores at least one background resource.

18. A system of a terminal device comprising one or more processors and one or more non-transitory computer-readable memories coupled to the one or more processors and configured with instructions executable by the one or more processors to cause the system to perform operations comprising:

downloading a background resource to be displayed, wherein the background resource comprises at least one of the following: an image resource and a video resource;

obtaining reference information for displaying the background resource, the reference information comprising:

feature information indicating image quality characteristics of the background resource, the feature information being generated based on an analysis of at least one of image brightness, noise intensity, blur degree, or a problematic region of the background resource, and   one or more device parameters of a display screen disposed behind an object indicating a display effect supported by the display screen, including at least a color gamut and a bit depth;

determining, by the terminal device, whether the display effect supported by the display screen is sufficient to render smooth color transitions in the background resource based on at least the color gamut and the bit depth;

in response to determining that the display effect is insufficient, performing image quality optimization on an image in the background resource according to the reference information to reduce visual artifacts by adjusting one or more pixel-level color transitions; and  displaying the background resource on the display screen disposed behind the object, to use the image in the background resource as a background of the object for filming.

* * * * *